(12) United States Patent
McCoy

(10) Patent No.: US 10,322,612 B2
(45) Date of Patent: Jun. 18, 2019

(54) ADAPTER FOR UNDER BED HITCH MOUNTING SYSTEM

(75) Inventor: Richard W. McCoy, Granger, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 591 days.

(21) Appl. No.: 13/314,673

(22) Filed: Dec. 8, 2011

(65) Prior Publication Data

US 2012/0145851 A1 Jun. 14, 2012

Related U.S. Application Data

(60) Provisional application No. 61/421,151, filed on Dec. 8, 2010.

(51) Int. Cl.
*B60D 1/01* (2006.01)
*B60D 1/48* (2006.01)

(52) U.S. Cl.
CPC .............. *B60D 1/015* (2013.01); *B60D 1/488* (2013.01)

(58) Field of Classification Search
CPC .... B62D 53/08; B62D 53/06; B62D 53/0828; B60D 1/01; B60D 1/52; B60D 1/488; B60D 1/14
USPC ......... 280/491.5, 433, 440, 438.1, 434, 407; 248/221.11, 680, 681
See application file for complete search history.

(56) References Cited

U.S. PATENT DOCUMENTS

| | | |
|---|---|---|
| 1,958,723 A | 5/1934 | Spencer |
| 1,996,162 A | 4/1935 | Lubbers |
| 2,027,990 A | 1/1936 | Lubbers |
| 2,041,124 A | 5/1936 | Francis |
| 2,289,079 A | 7/1942 | Seyferth |
| 2,507,616 A | 5/1950 | Stephen |
| 2,513,117 A | 6/1950 | Stephen |
| 2,543,749 A | 3/1951 | Walther |
| 2,610,069 A | 9/1952 | Ketel |
| 2,621,056 A | 12/1952 | Kayler |
| 2,680,627 A | 6/1954 | Johnson et al. |
| 2,749,144 A | 6/1956 | Kayler |
| 2,778,657 A | 1/1957 | Chaplin |
| 2,779,605 A | 1/1957 | Braunberger |

(Continued)

FOREIGN PATENT DOCUMENTS

| | | |
|---|---|---|
| DE | 2121876 | 4/1971 |
| EP | 0 038 928 | 4/1981 |

OTHER PUBLICATIONS

Cequent Towing Products, Inc., Installation Instructions Mounting Kit Ford F250/F350/F450 LD/HD/SD 6' & 8' Beds, Dec. 13, 2006, pp. 1-11, Litho in USA.

(Continued)

*Primary Examiner* — Muhammad Ijaz
(74) *Attorney, Agent, or Firm* — McDonald Hopkins LLC

(57) ABSTRACT

An adapter for mounting an accessory to a fixed feature positioned below a load bed of a vehicle is described. The adapter may include a mounting member, an aperture positioned on the mounting member, and a locking member capable of being inserted through the aperture, where the locking member is capable of selectively engaging the fixed feature. The adapter may also include at least one rail attached to the mounting member, and an accessory securing member positioned on the rail, the accessory securing member capable of selectively engaging an accessory.

9 Claims, 7 Drawing Sheets

(56) References Cited

U.S. PATENT DOCUMENTS

| | | | |
|---|---|---|---|
| 2,799,516 A | 7/1957 | Greenway | |
| 2,809,851 A | 10/1957 | Beck | |
| 2,819,096 A | 1/1958 | Sencenich | |
| 2,856,203 A | 10/1958 | Kayler | |
| 2,860,891 A | 11/1958 | Ramun | |
| 2,900,194 A | 8/1959 | De Lay | |
| 2,925,286 A | 2/1960 | Hodges, Jr. et al. | |
| 2,977,137 A | 3/1961 | Durham | |
| 2,985,463 A | 5/1961 | Geerds | |
| 3,073,624 A | 1/1963 | Thomas | |
| 3,112,936 A | 12/1963 | Cole et al. | |
| 3,170,716 A | 2/1965 | Walther et al. | |
| 3,171,672 A | 3/1965 | Dalton | |
| 3,198,549 A | 8/1965 | Martin | |
| 3,318,616 A | 5/1967 | Fontaine et al. | |
| 3,402,944 A | 9/1968 | Day | |
| 3,584,899 A | 6/1971 | Gottler et al. | |
| 3,595,125 A | 7/1971 | Jacobs | |
| 3,606,384 A | 9/1971 | Fontaine et al. | |
| 3,630,545 A | 12/1971 | Fontaine et al. | |
| 3,640,549 A | 2/1972 | Neff et al. | |
| 3,746,369 A | 7/1973 | Neff et al. | |
| 3,844,584 A | 10/1974 | Fontaine | |
| 3,847,414 A | 11/1974 | Madura | |
| 3,861,709 A | 1/1975 | Mulcahy et al. | |
| 3,888,514 A | 6/1975 | Klein | |
| 3,893,710 A | 7/1975 | Madura | |
| 3,941,407 A | 3/1976 | Breford | |
| 4,017,095 A | 4/1977 | Best | |
| 4,029,335 A | 6/1977 | Cady et al. | |
| 4,039,087 A | 8/1977 | Sandvick, Sr. | |
| 4,134,601 A | 1/1979 | Propst | |
| 4,429,892 A | 2/1984 | Frampton et al. | |
| 4,477,100 A | 10/1984 | Elyakim | |
| 4,505,344 A | 3/1985 | Hobbs et al. | |
| 4,531,774 A | 7/1985 | Whatley | |
| 4,614,355 A | 9/1986 | Koch | |
| 4,721,323 A | 1/1988 | Czuk et al. | |
| 4,856,804 A | 8/1989 | Nash | |
| 4,892,324 A | 1/1990 | Spencer et al. | |
| 4,921,266 A | 5/1990 | Beals | |
| 4,928,987 A | 5/1990 | Hunger | |
| 4,946,183 A | 8/1990 | Benson et al. | |
| 4,960,288 A * | 10/1990 | Chambers | B62D 53/0828 280/418.1 |
| 4,962,945 A | 10/1990 | Vannoy et al. | |
| 5,044,651 A | 9/1991 | Weikel | |
| 5,120,080 A | 6/1992 | Ritler | |
| 5,141,277 A | 8/1992 | Alexander | |
| 5,306,037 A | 4/1994 | Robertson | |
| D362,224 S | 9/1995 | McCoy et al. | |
| 5,449,191 A | 9/1995 | Cattau | |
| 5,509,682 A | 4/1996 | Lindenman et al. | |
| 5,513,869 A * | 5/1996 | Putnam | B60D 1/065 280/415.1 |
| 5,516,137 A | 5/1996 | Kass et al. | |
| 5,529,329 A * | 6/1996 | McCoy | B62D 53/0835 280/437 |
| D376,751 S | 12/1996 | Hanson et al. | |
| 5,580,073 A | 12/1996 | Irwin et al. | |
| D378,077 S | 2/1997 | Lindenman et al. | |
| 5,707,070 A * | 1/1998 | Lindenman | B62D 53/0814 280/407 |
| 5,738,471 A | 4/1998 | Zentner et al. | |
| 5,772,229 A * | 6/1998 | Cattau | B62D 53/0807 280/438.1 |
| 5,839,745 A * | 11/1998 | Cattau | B62D 53/0807 280/434 |
| 5,971,418 A * | 10/1999 | Lindenman | B60D 1/06 280/417.1 |
| 6,065,766 A * | 5/2000 | Pulliam | F16B 21/04 280/415.1 |
| 6,158,761 A * | 12/2000 | King | B60D 1/01 280/495 |
| 6,170,850 B1 | 1/2001 | Works | |
| 6,179,316 B1 | 1/2001 | Sibley, Jr. | |
| 6,199,889 B1 | 3/2001 | Golembiewski et al. | |
| 6,467,791 B1 | 10/2002 | Fandrich et al. | |
| 6,502,846 B2 * | 1/2003 | Fandrich | B60D 1/00 280/491.5 |
| 6,520,528 B2 | 2/2003 | Fandrich et al. | |
| 6,533,308 B1 | 3/2003 | Tambomino | |
| 6,851,695 B2 * | 2/2005 | Lindenman | B60D 1/015 248/231.9 |
| 7,100,935 B1 * | 9/2006 | Dunbar | B62D 53/0828 280/432 |
| 7,121,573 B2 * | 10/2006 | Lindeman | B62D 53/08 280/433 |
| 7,264,259 B2 | 9/2007 | Lindenman et al. | |
| 7,413,390 B1 | 8/2008 | Allison, Jr. et al. | |
| 7,775,541 B2 * | 8/2010 | Linger | B62D 53/0828 280/433 |
| 2003/0015855 A1 | 1/2003 | McCoy et al. | |
| 2003/0038452 A1 | 2/2003 | Lindenman et al. | |
| 2003/0209878 A1 | 11/2003 | Lindenman et al. | |
| 2003/0209879 A1 | 11/2003 | Lindenman et al. | |
| 2005/0146116 A1 * | 7/2005 | Lindenman | B62D 53/08 280/433 |
| 2007/0083341 A1 * | 4/2007 | Gutierrez | B62D 53/08 702/173 |
| 2010/0109285 A1 | 5/2010 | Stanifer et al. | |
| 2017/0305218 A1 * | 10/2017 | Stanifer | B60D 1/015 |

OTHER PUBLICATIONS

Cequent Performance Products, Installation Instructions Gooseneck Mounting Kit Chevrolet/GMC 2500/3500 Heavy Duty Short & Long Bed, (Part No. 4456), Apr. 11, 2011, pp. 1-8.

Instruction Sheet No. 63102N, Make/Model(s) Hide-A-Goose, Mar. 26, 2007, 4 pages.

Instruction Sheet No. 50117N, Make/Model(s) Dodge Pick-Ups, 2003-UP 2500, 3500 All Models, Mar. 22, 2007, 3 pages.

Cequent Towing Products, Inc., Operating Instructions Signature Series 5th Wheel Slider Hitch, pp. 1-12, Jan. 23, 2004, Litho in USA.

Cequent Towing Products, Inc., Installation Instructions Mounting Kit GM '99-'07 "Classic" 1500 (LD/HD) and 2500 5'8" & 6'6" Beds Only, Aug. 29, 2008, 10 pages, Litho in USA.

Cequent Towing Products, Inc., Installation Instructions Mounting Kit Ford 2004—Current F150 5.5', 6' and 8' Beds, 11 pages, Aug. 21, 2008, Litho in USA.

Cequent Towing Products, Inc., Assembly Instructions Signature Series 24K 5th Wheel Hitch, pp. 1-11, Jan. 28, 2004, Litho in USA.

Draw-Tite Catalog 2004, 7 pages.
Draw-Tite Catalog 2005, 7 pages.
Draw-Tite Catalog 2006, 5 pages.
Draw-Tite Catalog, 2007, 6 pages.
Draw-Tite Catalog, 2008, 3 pages.
Reese Catalog, 2004, 8 pages.
Reese Catalog, 2005, 9 pages.
Reese Catalog, 2006, 6 pages.
Reese Catalog, 2007, 7 pages.
Reese Catalog, 2008, 5 pages.

Cequent Towing Products, Inc., Operating Instructions Signature Series 5th Wheel Slider Hitch, pp. 1-12, Dec. 13, 2004, Litho in USA.

Cequent Towing Products, Inc., Assembly Instructions Signature Series 5th Wheel Slider Hitch, pp. 1-16, Jan. 23, 2004, Litho in USA.

Cequent Towing Products, Inc., Assembly Instructions Signature Series 5th Wheel Slider Hitch, pp. 1-16, Jan. 5, 2004, Litho in USA.

Cequent Towing Products, Inc., Assembly Instructions Signature Series 16K 5th Wheel Hitch, pp. 1-11, Mar. 15, 2005, Litho in USA.

Cequent Towing Products, Inc., Assembly Instructions Signature Series 24K 5th Wheel Hitch, pp. 1-11, Dec. 13, 2004, Litho in USA.

Cequent Towing Products, Inc., Operating Instructions Signature Series 16K 5th Wheel Hitch, pp. 1-9, Dec. 14, 2004, Litho in USA.

(56) References Cited

OTHER PUBLICATIONS

Cequent Towing Products, Inc., Assembly Instructions Signature Series Gooseneck, pp. 1-14, Oct. 13, 2006, Litho in USA.
Cequent Towing Products, Inc., Assembly Instructions Signature Series 24K 5th Wheel Hitch, pp. 1-11, Jun. 15, 2006, Litho in USA.
Cequent Towing Products, Inc., Assembly Instructions Signature Series 24K 5th Wheel Hitch, pp. 1-11, May 21, 2008, Litho in USA.
Cequent Towing Products, Inc., Assembly Instructions Signature Series 5th Wheel Slider Hitch, pp. 1-17, Jun. 2, 2004, Litho in USA.
Cequent Towing Products, Inc., Operating Instructions Signature Series 24K 5th Wheel Hitch, pp. 1-9, Mar. 15, 2005, Litho in USA.
Cequent Towing Products, Inc., Operating Instructions Signature Series 24K 5th Wheel Hitch, pp. 1-9, May 21, 2008, Litho in USA.
Cequent Towing Products, Inc., Operating Instructions Signature Series 24K 5th Wheel Hitch, pp. 1-9, Dec. 14, 2004, Litho in USA.
Cequent Towing Products, Inc., Operating Instructions Signature Series 24K 5th Wheel Hitch, pp. 1-9, Aug. 20, 2007, Litho in USA.
Cequent Towing Products, Inc., Assembly Instructions Signature Series 24K 5th Wheel Hitch, pp. 1-11, Jan. 6, 2006, Litho in USA.
Cequent Towing Products, Inc., Operating Instructions Signature Series 24K 5th Wheel Hitch, pp. 1-9, Jan. 28, 2004, Litho in USA.
Cequent Towing Products, Inc., Assembly Instructions Signature Series 5th Wheel Slider Hitch, pp. 1-17, Jan. 24, 2007, Litho in USA.
Cequent Towing Products, Inc., Operating Instructions Signature Series 5th Wheel Slider Hitch, pp. 1-12, Aug. 20, 2007, Litho in USA.
Cequent Towing Products, Inc., Operating Instructions Signature Series 5th Wheel Slider Hitch, pp. 1-12, Jan. 25, 2007, Litho in USA.
PCT/US2011/63922, Under Bed Hitch Mounting System, Cequent Performance Products, Dec. 8, 2011.
U.S. Appl. No. 12/609,062, Cequent Performance Products, Inc., dated Oct. 30, 2009.

* cited by examiner

ADAPTER FOR UNDER BED HITCH MOUNTING SYSTEM

CROSS-REFERENCE TO RELATED APPLICATION

This application claims benefit from U.S. Provisional Patent Application No. 61/421,151 entitled "Adapter for Under Bed Hitch Mounting System" filed on Dec. 8, 2010, which is hereby incorporated in its entirety by reference.

FIELD OF INVENTION

The present invention is generally related to a towing apparatus and, more particularly, to an adapter for an under bed hitch mounting system.

BACKGROUND

Many vehicles are designed to transport freight, goods, merchandise, personal property, and other such cargo. An operator often utilizes a hitch assembly to connect a towed vehicle to a towing vehicle, e.g., connecting a trailer to a pick-up truck, to increase the capacity to transport cargo. Many types of coupling devices have been developed for providing this connection between towing and towed vehicles.

It is well known to utilize a hitch to connect a towed vehicle to a towing vehicle. There are many different types of hitches that may be attached to the towing vehicle in a variety of ways, depending on the type of hitch used. For example, some fifth wheel hitches mount to the frame underneath the bed of the pickup truck while other fifth wheel hitches mount to an above bed mounting system.

Traditional fifth wheel hitches include a head assembly for receiving a king pin on a towed vehicle, a base having a plurality of legs, and one or more mounting rails. In some systems, the legs of the fifth wheel hitch are designed to be secured to mounting rails that are attached above the bed or on the bed of the towing vehicle. In other systems, the mounting rails may be fixed to the frame of a vehicle underneath the bed. For example, the mounting rails may be connected between two portions of a pickup truck frame underneath the truck bed. The mounting rails may include a plurality of apertures for receiving the legs of the fifth wheel hitch. Corresponding openings may be cut in the truck bed and aligned with the apertures in the mounting rails. The legs of the fifth wheel hitch may be connected to apertures in the mounting rails through the openings in the truck bed, thereby securing the fifth wheel hitch to the frame of the vehicle.

This configuration, however, may limit the available fifth wheel hitches that may be attached to a specific vehicle. There are a wide variety of fifth wheel hitches on the market, many of which have very different mounting configurations, including those that may only be capable of being secured above the load bed of the vehicle. Moreover, the under bed mounting systems have fixed mounting points, which may limit the available adjustability of the system. Accordingly, a particular configuration of an under bed mounting system may fit only a limited amount of configurations of fifth wheel hitches. This may limit the variety of fifth wheel hitches that may attach to a particular under bed hitch mounting system. There is a need, therefore, for an apparatus to overcome these limitations and to provide a mounting system to which accessories such as fifth wheel hitches of different varieties may attach.

SUMMARY

An adapter for mounting an accessory to a fixed feature positioned below a load bed of a vehicle is disclosed. The adapter may include a mounting member, an aperture positioned on the mounting member, and a locking member capable of being inserted through the aperture, where the locking member is capable of selectively engaging the fixed feature. The adapter may also include at least one rail attached to the mounting member, and an accessory securing member positioned on the rail, the accessory securing member capable of selectively engaging an accessory.

An adapter for mounting an accessory to a fixed feature attached to a frame of a vehicle, where the fixed feature may include at least one receiving member is disclosed. The adapter may include a mounting member and a locking member selectively positionable on the mounting member, where the locking member is capable of selectively engaging the receiving member of the fixed feature. The adapter may also include at least one rail attached to the mounting member, and an accessory securing member positioned on the rails, the accessory securing member capable of selectively engaging an accessory.

An adapter for mounting an accessory to an under bed hitch mounting system attached to a frame of a vehicle where the under bed hitch mounting system may include at least one receiving member. The adapter may include a mounting member, and at least one locking member engageable with the mounting member and capable of selectively engaging the receiving member. The adapter may also include at least one rail attached to the mounting member, and a plurality of accessory securing members positioned on the rails at predetermined locations, any one of the plurality of accessory securing members capable of selectively engaging an accessory at the predetermined locations along the rail.

DESCRIPTION OF THE DRAWINGS

Operation of the invention may be better understood by reference to the following detailed description taken in connection with the following illustrations, wherein.

DETAILED DESCRIPTION

Figure 1:
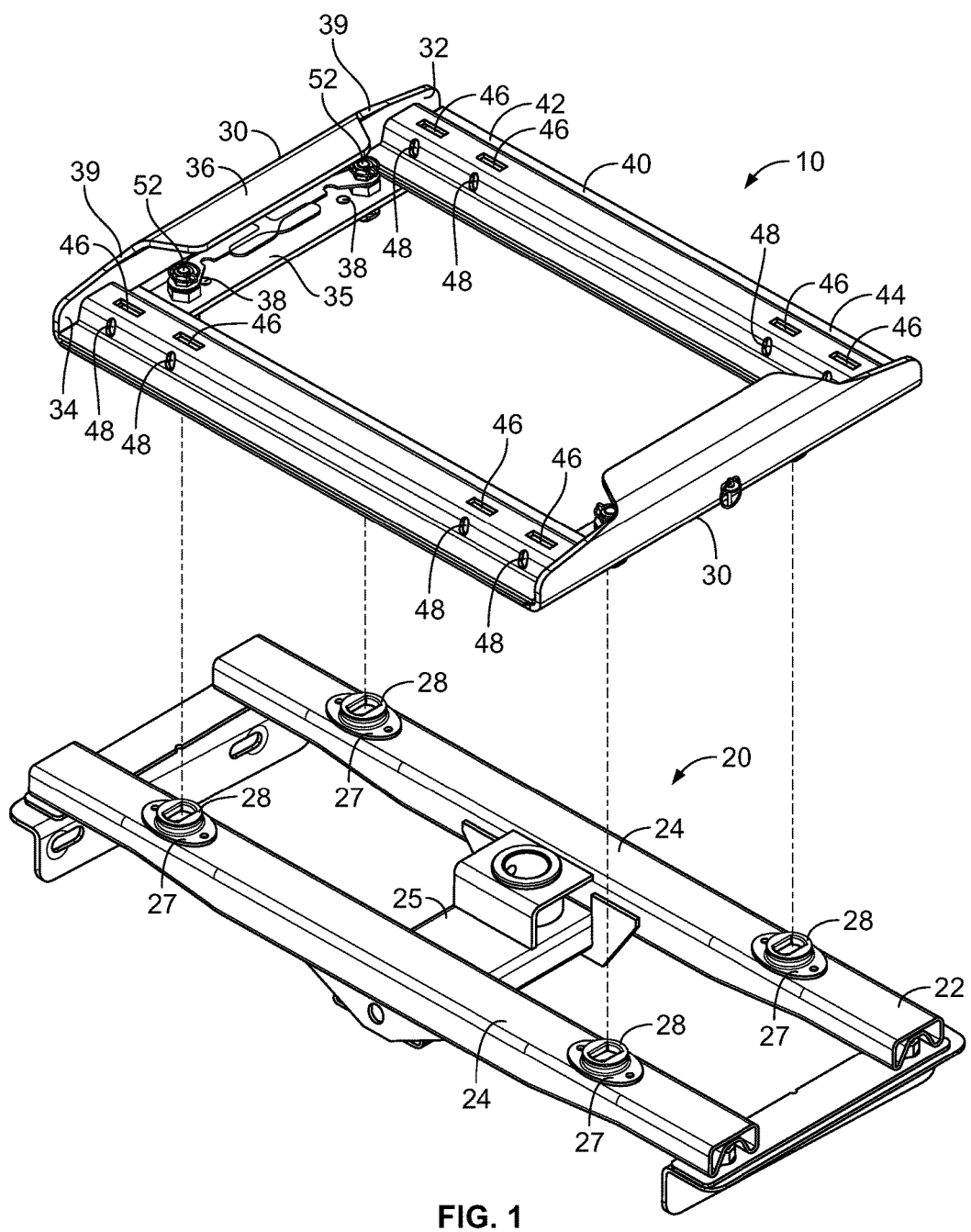
FIG. 1 is a perspective view of an adapter for an under bed hitch mounting system and an under bed hitch mounting system for a vehicle.
Figure 2:
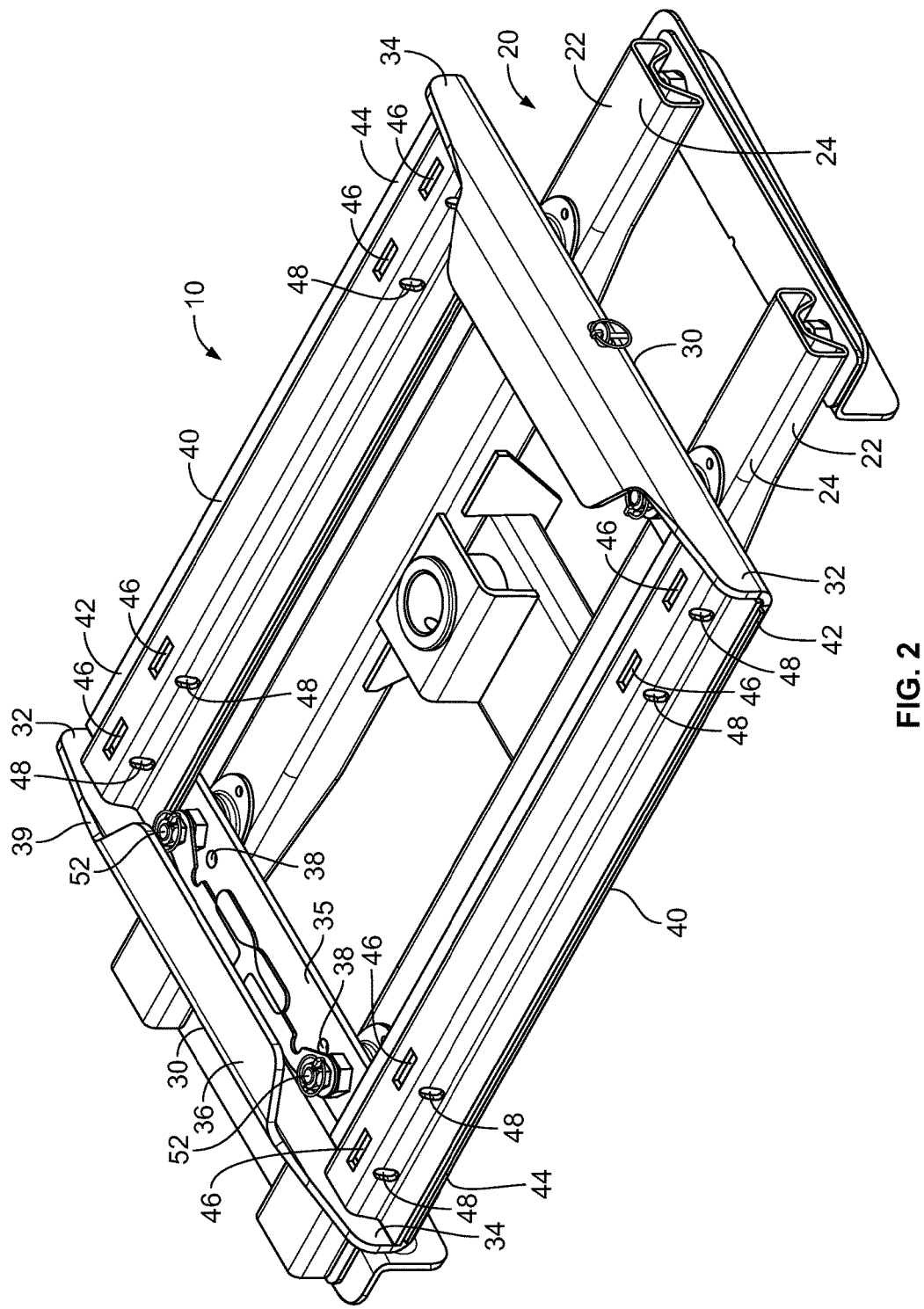
FIG. 2 is a perspective view the adapter secured to the under bed hitch mounting system.

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

FIGS. 1-4 illustrate an adapter 10 capable of securing a variety of fifth wheel hitches to an under bed hitch mounting system 20. The adapter 10 may allow fifth wheel hitches or any other appropriate accessory that may not otherwise be capable of being secured to the under bed hitch mounting system 20 to be operatively secured to the under bed hitch mounting system 20. In the some embodiments, the adapter 10 may be capable of fitting within a load bed 12 of a towing vehicle 14 immediately over the applicable under bed mounting system 20. In these embodiments, the adapter 10 may generally convert the under bed mounting system 20 to an above bed mounting system. While the fifth wheel hitch 26 may be shown and described as being secured to the adapter 10, it should be understood that the present teachings are not limited to such. The adapter 10 may be used to attach any appropriate accessory to the applicable under bed mounting system 20 or other fixed feature on the vehicle.

In some embodiments, the under bed mounting system 20 may include at least one rail or transverse member 22 having a top surface 24 and may include at least one mid rail or adapter plate 25. By way of a non-limiting example as shown in FIGS. 1-2 and 8-9, the mounting system 20 may include two rails 22 and one adapter plate 25. The rails 22 may be configured to operatively couple a fifth wheel hitch 26 and the adapter plate 25 may be configured to operatively couple a gooseneck hitch (not shown). While the under bed hitch mounting system 20 may be shown and described as having two rails 22 and one mid rail or adapter plate 25, it is to be understood that there may be any appropriate number of rails or adapter plates and it should not be limited to that shown and described herein. Moreover, in other embodiments, the under bed mounting system may not include the adapter plate 25.

Each rail 22 of the under bed hitch mounting system 20 may include one or more sockets 27. The sockets 27 may be of any appropriate shape or size, such as a generally ovular, circular or rectangular shape and may accept some form of receiving member 28. In these embodiments, apertures may be drilled or cut in the load bed of the applicable vehicle where such apertures generally correspond to the locations of the sockets 27 in the rails 22.

In an embodiment shown, the sockets 27 may be configured to receive a receiving member 28 that may comprise a puck mounting system, such as that disclosed in U.S. Patent Application Publication No. 20100109285, entitled "UNDERBED HITCH MOUNTING SYSTEM," and that disclosed in U.S. Pat. No. 7,121,573, entitled "VEHICLE ACCESSORY MOUNTING SYSTEM," the disclosures of which are incorporated by reference herein. Utilizing a puck mounting system may provide uninhibited use of the truck bed when the fifth hitch and adapter 10 are dismounted from the under bed hitch mounting system 20.

While the exemplary embodiments of the under bed hitch mounting system 20 are shown and described herein, the present teachings are not limited to exemplary under bed hitch mounting system 20. Any appropriate hitch mounting system may be utilized. By way of a non-limiting example, the under bed hitch mounting system shown and described in U.S. Patent Application Publication No. 20100109285, entitled "UNDERBED HITCH MOUNTING SYSTEM," U.S. Pat. No. 7,121,573, entitled "VEHICLE ACCESSORY MOUNTING SYSTEM," and U.S. application Ser. No. PCT/US11/63922, entitled "UNDER BED HITHC MOUNTING SYSTEM," the disclosures of which are incorporated by reference herein.

Specific versions of fifth wheel hitches may attach directly to the under bed hitch mounting system 20; provided that the configuration of the fifth wheel hitch generally matches that of the under bed hitch mounting system 20. If, however, the fifth wheel hitch and the under bed hitch mounting system 20 are not configured to match, the fifth wheel hitch may not capable of being attached directly. The adapter 10, therefore, may be used to attach the fifth wheel hitch or any other appropriate accessory to the under bed hitch mounting system 20. Moreover, if there is a need or desire to attach the fifth wheel hitch 26 above the load bed 12 of the towing vehicle 14 instead of under the load bed 12, the adapter 10 may be used.

In some embodiments, the adapter 10 may include at least one mounting member 30 having end portions 32, 34. The mounting member 30 may be made of any appropriately rigid material such as by way of a non-limiting example, steel. Further, in some embodiments, the mounting member 30 may be a plate that has a generally flat bottom portion 35 and a top portion 36 that may generally bend over the bottom portion 35. It should be understood, however, that the mounting member 30 may be of any appropriate shape, such as by way of non-limiting examples, generally square, circular, trapezoidal, elliptical, or a combination thereof. In other embodiments, the mounting member 30 may be a generally tubular member.

Figure 3:
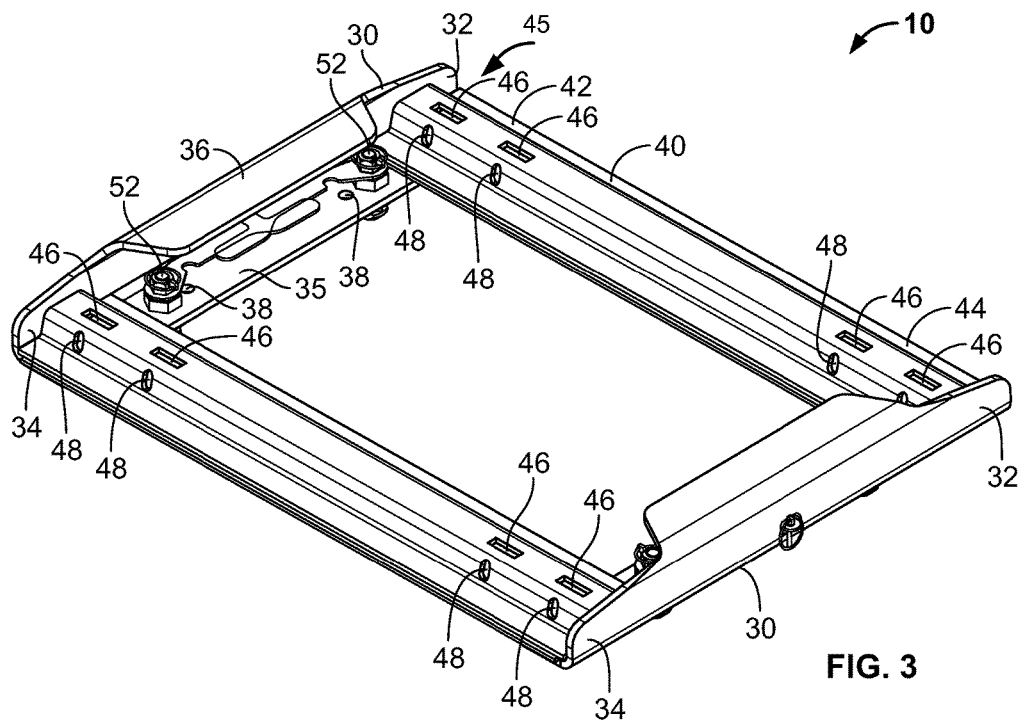
FIG. 3 is a perspective view of a top portion of the adapter of FIG. 1.
Figure 4:
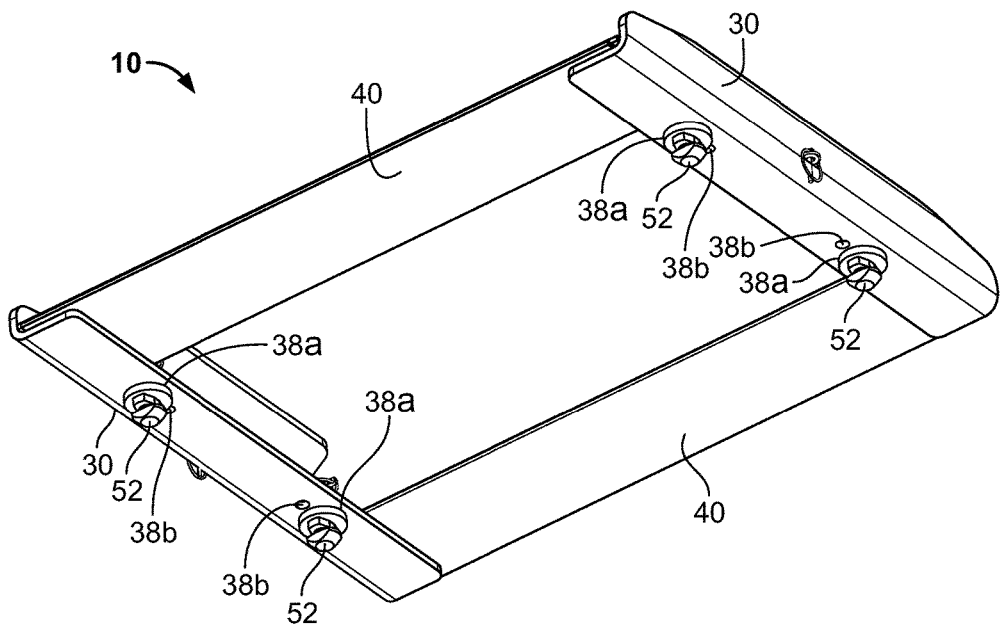
FIG. 4 is a perspective view of a bottom portion of the adapter of FIG. 1.

The longitudinal members 30 may include a plurality of apertures 38 positioned at appropriate positions along the bottom portion 35 thereof. In some embodiments, each mounting member 30 may include four such apertures 38, positioned as shown in FIGS. 3-4. In these embodiments, a first pair 38a of the apertures 38 may be positioned generally proximate to the ends 32, 34 of the mounting member 30. Further, a second pair 38b of the apertures 38 may be positioned generally distally from the ends 32, 34 of the mounting member 30. The present teachings, however, are not limited to the two pairs of apertures 38a, 38b shown, any number of apertures 38 may be used. In other embodiments, the mounting member 30 may only include a pair of apertures 38.

The apertures 38 may be positioned such that the apertures 38 may generally align with an appropriate under bed hitch mounting system, such as by way of a non-limiting example, the under bed hitch mounting system 20. By way of a non-limiting example, the apertures 38 may be positioned along the mounting member 30 so that they may generally align with the sockets 27 of the rails 22. Therefore, the adapter 10 may be able to be secured to the under bed hitch mounting system 20 even if the sockets 27 of the applicable under bed hitch mounting system 20 are in different positions. In these embodiments, therefore, at least two of the apertures 38 may generally align with the sockets 27.

Further, the mounting member 30 may include access points 39. In some embodiments, the access points 39 may be generally formed by the formation of the top portion 36 and bottom portion 35. By way of a non-limiting example, the top portion 36 may be generally folded, bent or the like relative to the bottom portion 35. During this process, the access points 39 may be generally formed in any appropriate manner. The access points 39 may permit an operator to generally access the apertures 38 on the mounting member 30. This access may assist in installing the adapter 10 to the under bed hitch mounting system 20 and the appropriate vehicle. While the access points 39 in the present embodiments are shown as being formed by folding of the top portion 36, the present teachings are not limited to such. By way of a non-limiting example, the access points 39 may be formed by including an opening in the generally rectangular tubular mounting member 30, by including slots in the mounting member 30 or any other appropriate process.

In some embodiments, the adapter 10 may include at least one rail 40—the rail may include a first end 42 and a second end 44. In the exemplary embodiments shown, the adapter 10 may include a pair of rails. In these embodiments, the ends 32, 34 of the mounting members 30 may generally attach to the ends 42, 44 of the rails 40. The mounting members 30 and the rails 40 may be attached in any appropriate manner, such as by way of a non-limiting example by welding, adhesives, fasteners or the like. In some embodiments, the mounting members 30 and the rails 40 may be welded together.

The rails 40 may include any appropriate number of accessory securing members 45. In some embodiments, the accessory securing members 45 may include slot 46 and corresponding aperture 48. In these embodiments, the rails 40 may include any appropriate number of slots 46 and apertures 48, e.g., one, two, three, four, etc., wherein the apertures 48 may generally correspond to the position of slots 46. In some embodiments, the rails 40 may include a plurality of slots 46 and a plurality of apertures 48; the apertures 48 may generally correspond to the position and number of slots 46. By way of a non-limiting example, each end 42, 44 of the rails 40 may include a pair of slots 46 and a pair of apertures 48; wherein the slots 46 may be generally positioned in conjunction with the apertures 48 along the rails 40. Although each end 42, 44 of the rails 40 are shown to include a pair of slots 46 and apertures 48, the present teachings are not limited to this. Any appropriate number of slots 46 and apertures 48 may be used.

The slots 46 may be sized and positioned along the rails 40 such that a leg 51 of the fifth wheel hitch 26 may be appropriately secured thereto. In some embodiments, the slots 46 may be sized and positioned such that the leg 51 of the fifth wheel hitch 26 may be inserted into the appropriate slot 46. The number and position of the slots 46 and apertures 48 may generally correspond to the position of the legs of varieties of fifth wheel hitches that may be capable of attaching to the adapter 10. In some embodiments, the rails 40 may include more than the two pairs of slots 46 and apertures 48 to accommodate fifth wheel hitches having legs spaced apart different amounts.

It should be understood, however, that although the accessory securing members 45 are shown as slots 46 and corresponding apertures 48, the present teachings are not limited to such. The accessory securing members 45 may include any appropriate mechanism that may attach the fifth wheel hitch 26 or other accessory to the adapter 10.

In operation, the adapter 10 may help facilitate the mounting of an accessory to a fixed feature on a vehicle. By way of a non-limiting example, the adapter 10 may facilitate an accessory such as the fifth wheel hitch 26 including, without limitation most any after-market fifth wheel hitch, to be attached to most any kind of fixed under bed mounting system 20. In some embodiments the operator may attach and remove the fifth wheel hitch 26 with generally reduced effort. The operator may attach the adapter 10 to the under bed hitch mounting system 20 of the vehicle and then attach the fifth wheel hitch 26 to adapter 10 in any appropriate manner. To remove the fifth wheel hitch 26 from the towing vehicle 14, the operator may need only remove the adapter 10 from the under bed hitch system 20 while leaving the fifth wheel hitch 26 attached to the adapter 10.

More specifically, in some of these embodiments, the adapter 10 may attach to the under bed hitch mounting system 20 in any appropriate manner. By way of a non-limiting example, the adapter 10 may be placed onto the load bed 12 of the towing vehicle 14. The apertures 38 of the mounting member 30 may generally align with the sockets 27 in the rails 22 of the under bed hitch mount 20. A locking member 52 may then be inserted through the aperture 38 in the mounting member 30 and into the sockets 27. This may attach the adapter 10 to the under bed hitch mounting system 20. This may be repeated for each of the apertures 38 that correspond with the applicable socket 27.

Figure 10:
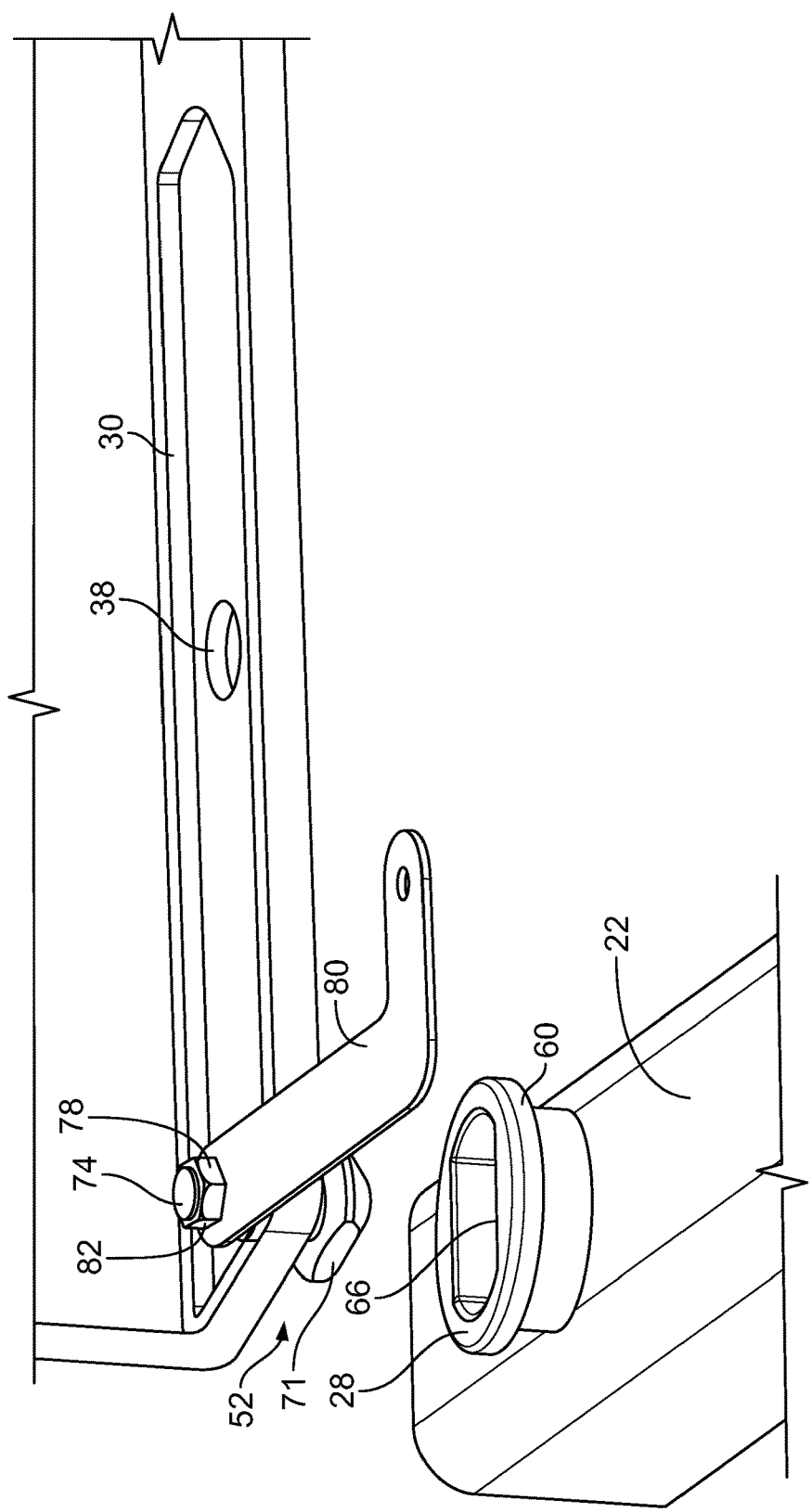
FIG. 10 is a detailed view of a portion of a mounting member being installed on an under bed hitch mounting system.

By way of a non-limiting example, the locking member 52 of some embodiments may comprise a quarter turn T-bolt system, such as that shown in FIG. 10. In these embodiments, the T-bolt system may include a handle 80 that may be graspable by the operator and may generate enough torque to adequately tighten the T-bolt system. The T-bolt system may further include a bolt 74 attached to the T-shaped handle. In these embodiments, the operator may insert the bolt through the aperture 38 into the socket 27. The operator may then rotate the T-shaped handle 80 one quarter turn, which may lock the adapter 10 to the under bed hitch mounting system 20. The operator may repeat this step for each aperture 38 that corresponds to a socket 27. In these embodiments, that may include four such apertures 38 and corresponding sockets 27.

In some embodiments, the receiving members 28 may include a projecting rim or upper wall 60 and a locking cavity 66. The locking cavity 66 may have a generally acircular cross sectional shape. The locking member 52 may include at least one locking lug 71 and an accessory mounting shank 74. As shown, the locking member 52 may include two opposed locking lugs 71. The locking member 52 may be capable of entering into and seating in the cavity 66. Once fully seated, the locking member 52 may be rotated approximately 90 degrees with respect to the receiving member 28 other so that the locking lugs 71 may engage the receiving member 28 thereby securing the locking member 52 in the receiving member 28.

The locking member 52 may be secured to the mounting member 30 by means of the mounting shank 74 and a matingly engaging nut 78. More specifically, the accessory mounting shank 74 may be inserted through at least one of the apertures 38 in the mounting member 30, or more specifically in the bottom portion 35 thereof and the nut 78 may matingly engage the mounting shank 74. A control handle 80 may then be connected to the locking member 52.

The control handle 80 may be positioned so that the accessory mounting shank 74 may extend up through the mounting member 30 may be received in an aperture 82 in the control handle 80. The aperture 82 may be generally acircular and may engage a cooperating acircular shoulder on the accessory mounting shank 74. The nut 78 may then be tightened down on the accessory mounting shank 74 so as to secure the control handle 80 to the locking member 52 and the locking member 52 to the mounting member 30.

When it is desired to selectively attach the adapter 10 to the under bed hitch mounting system, each locking member 52 may be aligned by operation of its respective control handle 80 so that the locking member 52 including the locking lugs 71 may be appropriately aligned with the associated receiving member 28. This may allow for the clearance necessary to generally allow each locking member 52 to drop into and be fully seated in the locking cavity 66 of the associated receiving member 28. Once each locking member 52 is fully seated, the control handle 80 may be rotated through an arc of approximately 90 degrees. Simultaneously, the locking member 52 may be rotated so that the locking lugs 71 may engage the locking cavity 66.

This engagement between the lugs 71 and the locking cavity 66 may serve to secure the locking member 52 in the receiving members 28 and, therefore, the adapter 10 to the under bed hitch mounting system 20. The control handles 80 may be secured in a locking position. The present teachings, however, are not limited to the above locking member. Any appropriate system may be used with the adapter 10, not just the locking member 52 shown and described above.

In some embodiments, once the adapter 10 may be attached to the under bed hitch mounting system 20 of the vehicle, the fifth wheel hitch 26 may then be attached to the adapter 10. In these embodiments, the legs 51 of the fifth wheel hitch 26 may be inserted into the slots 46, a fastener (not shown) may then be inserted into apertures 48, which may secure the legs 51 of the fifth wheel 26 hitch to the rails 40. Alternatively, many aftermarket fifth wheel hitches use pins and clips to attach to the towing vehicle 14. In these embodiments, the legs 51 of the fifth wheel hitch 26 may be inserted into the corresponding slot 46. A pin 88 may then be inserted through the aperture 48. The clip (not shown) may be inserted into the pin to secure the fifth wheel hitch 26 to the adapter 10 and in turn to the under bed hitch mounting system 20. In these embodiments, the fifth which hitch 26 may be attached above the load bed 12 of the towing vehicle 14. In yet other embodiments, the legs 51 of the fifth wheel hitch 26 may be welded directly to the rail 40 or otherwise attached directly thereto.

To remove the fifth wheel hitch 26, the operator may remove the adapter 10 from the vehicle, or more specifically, from the under bed hitch mounting system 20. This may permit the load bed 12 of the towing vehicle 14 to be fully accessible and useable. In particular, in some embodiments, the operator may rotate the handle one-quarter turn and remove the locking lugs 71, i.e., T-bolts, from the aperture 38 and the corresponding socket 27. The operator may repeat this step for each locking member 52 present. Once all of the fasteners 52 have been loosened, the combination of the adapter 10 and the accessory, e.g., the fifth wheel hitch 26, may be removed from the vehicle. The fifth wheel hitch 26 need not be removed from the adapter 10, but may be if desired.

In some embodiments, the adapter 10 may provide a clearance for the load bed 12 of the towing vehicle 14. In particular, the adapter 10 being attached to the under bed hitch mounting system 20, may provide a clearance such as one-quarter to one-half of an inch. This clearance may generally prevent the adapter 10 and the fifth wheel hitch 26 from contacting the load bed 12 of the towing vehicle 14. Moreover, there may be enough clearance to allow a bed liner to be placed between the adapter 10 and the under bed hitch mounting system 20.

Additional embodiments of an adapter according the present teachings are described below. In the descriptions, all of the details and components may not be fully described or shown. Rather, the features or components are described and, in some instances, differences with the above-described embodiments may be pointed out. Moreover, it should be appreciated that these additional embodiments may include elements or components utilized in the above-described embodiments although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired adapter without departing from the spirit and scope of the present teachings.

Figure 5:
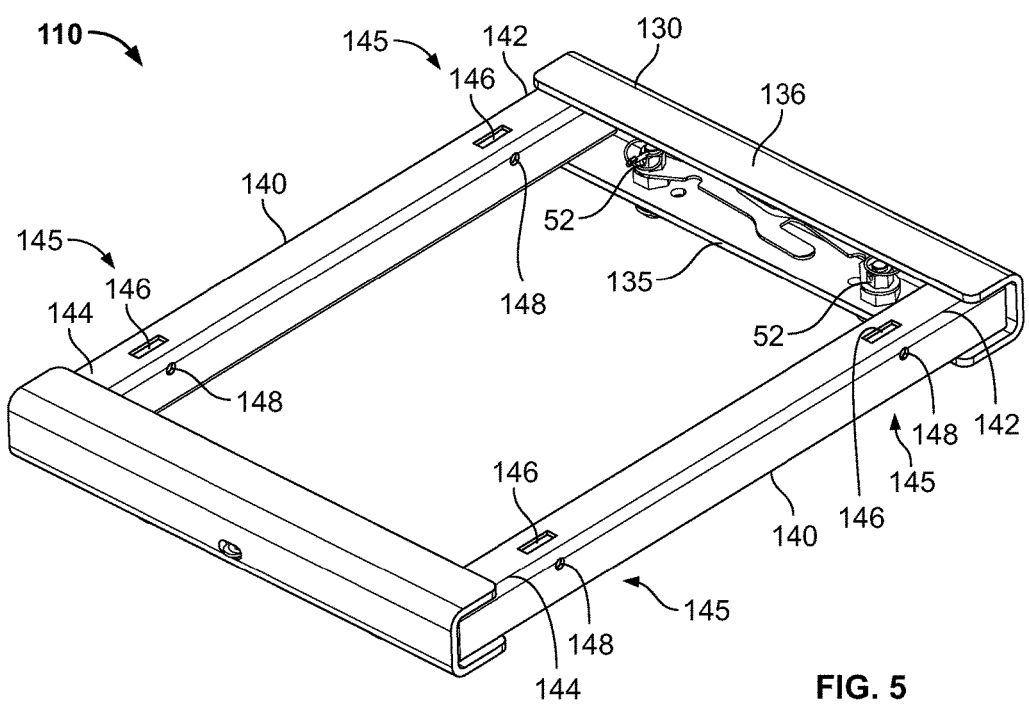
FIG. 5 is a perspective view of other embodiments of an adapter.
Figure 6:
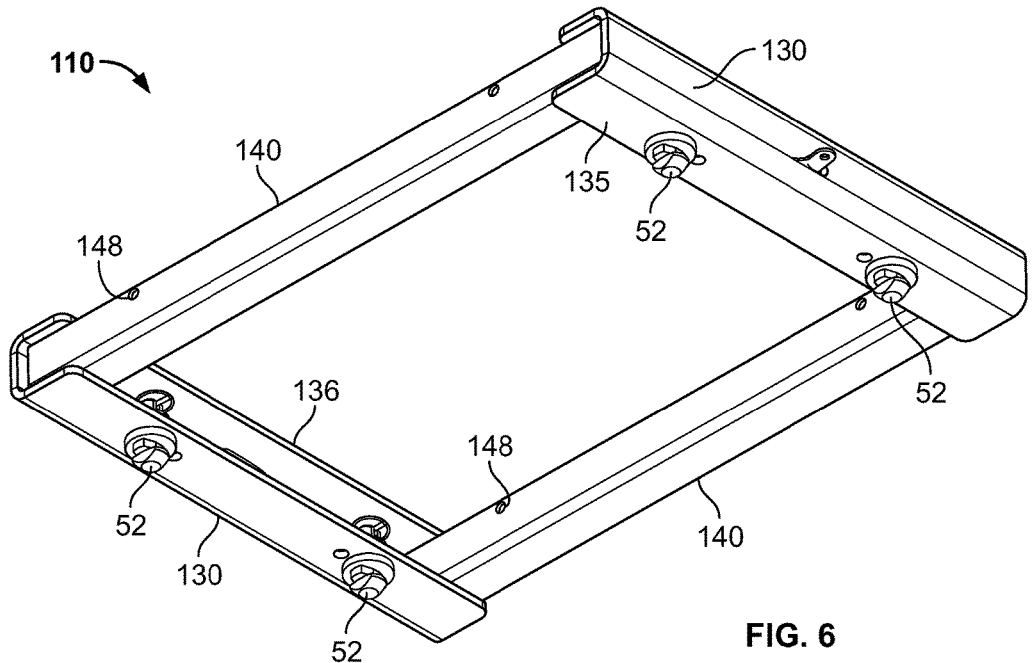
FIG. 6 is a perspective view of a bottom portion of the adapter of FIG. 5.

In other embodiments, the adapter 110 may include at least one transverse member 130; as shown in FIGS. 5 to 6 the adapter may include a pair of transverse members 130. The transverse members 130 may include bottom portions 135 and top portions 136. The top portions 135 may generally cover at least a portion of the bottom portion 136 and in some embodiments may generally the entire bottom portions 136. This may create generally C-shaped transverse members 130.

The adapter 110 may include at least rail 140 that may be coupled to the transverse members 130 in any appropriate manner. In some embodiments, the adapter 110 may include a pair of rails 140; each such pair of rails 140 may be attached to the transverse members 130. The rails 130 may have a generally rectangular cross-section and that may include first ends 142 and second ends 144. The first and second ends 142, 144 may generally fit between the top and bottom portions 136, 135 of the transverse member 130. The rails 140 and transverse members 130 may be attached together in any appropriate manner, including, without limitation by welding, using fasteners, adhesives, integrally forming, or the like.

The rails 140 of the adapter 110 may further include at least one accessory securing member 145. The accessory securing member 145 may include at least one slot 146 and at least one aperture 148. In these embodiments, the rails 140 may include any appropriate number of accessory securing members 145. By way of a non-limiting example, the rails 140 may include any appropriate number of slots 146 and apertures 148. The apertures 148 may be positioned on the rails 140 such that they may generally correspond to the position of slots 146; and the number of apertures 148 may generally match the number of slots 146 on each rail 140.

The accessory securing members 145 may be positioned on the rails 140 such that the appropriate accessory may be selectively secured thereto. In some embodiments, the accessory securing members 145 may be positioned on the rails 140 such that legs 51 of the fifth wheel hitch 26 may be attachable thereto. By way of a non-limiting example, the slots 146 may be sized and positioned along the rails 140 such that the leg 51 of the fifth wheel hitch 26 may be insertable therein. The number and position of the slots 146 may generally correspond to the location and position of the legs of a variety of fifth wheel hitches. It should be understood, however, that although slots 146 and corresponding apertures 148 are shown as the accessory securing member 145, the present teachings are not limited to such. The accessory securing members 145 may include any mechanism that may attach a fifth wheel hitch or other accessory to the adapter 110. The adapter 110 may otherwise generally operate as the adapter 10 described above.

Figure 7:
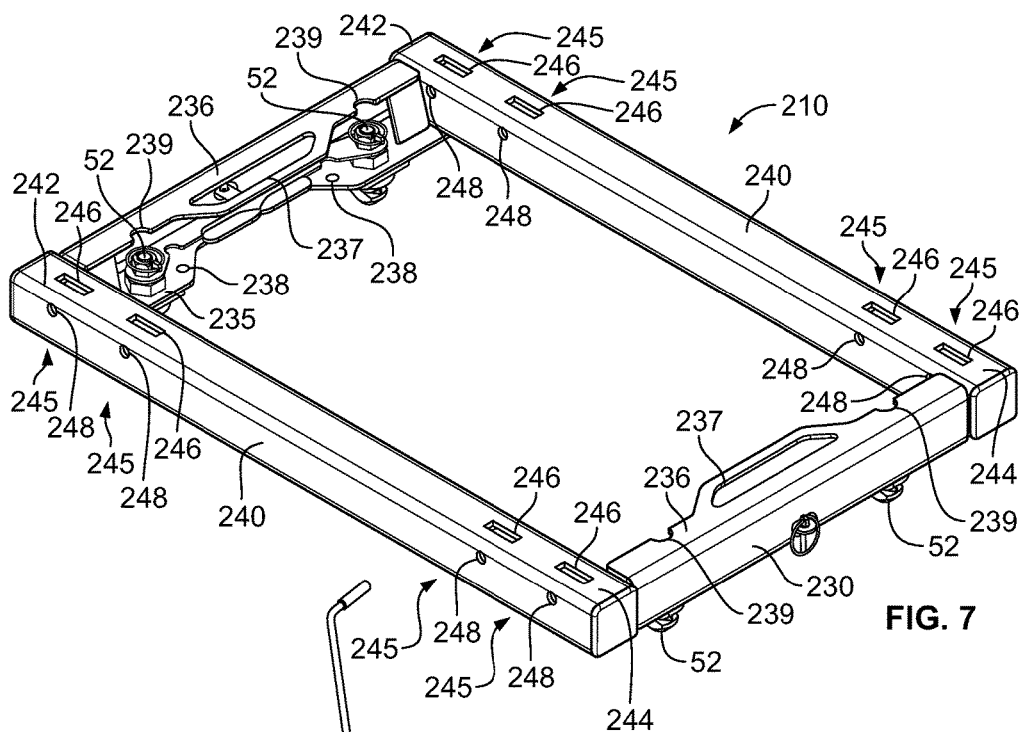
FIG. 7 is a perspective view of other embodiments of an adapter.
Figure 8:
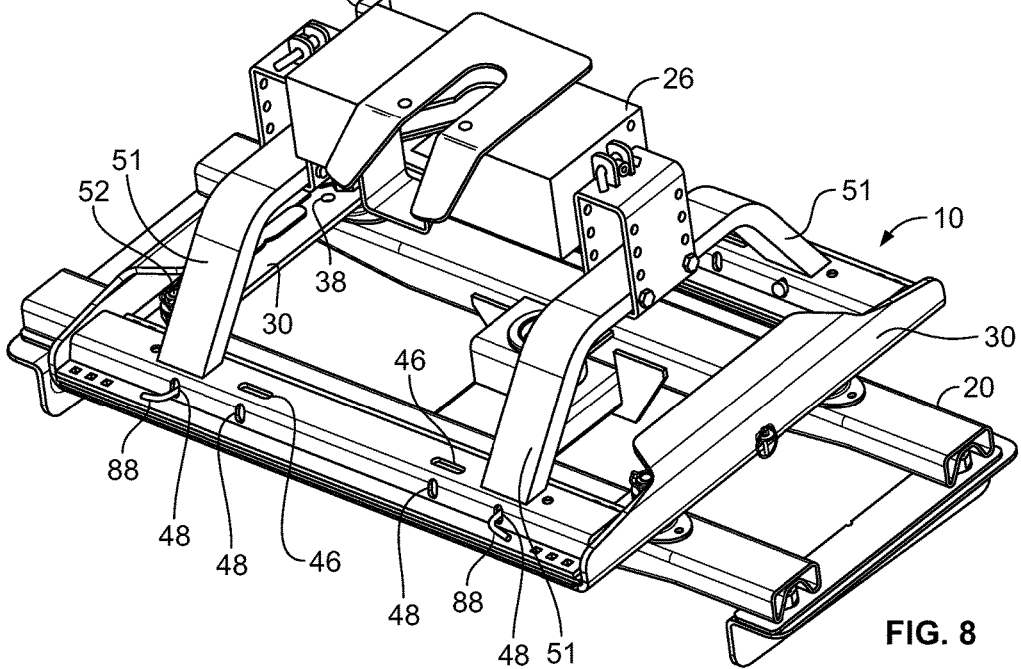
FIG. 8 is a perspective view of a fifth wheel hitch attached to an adapter secured to an under bed hitch mounting system.
Figure 9:
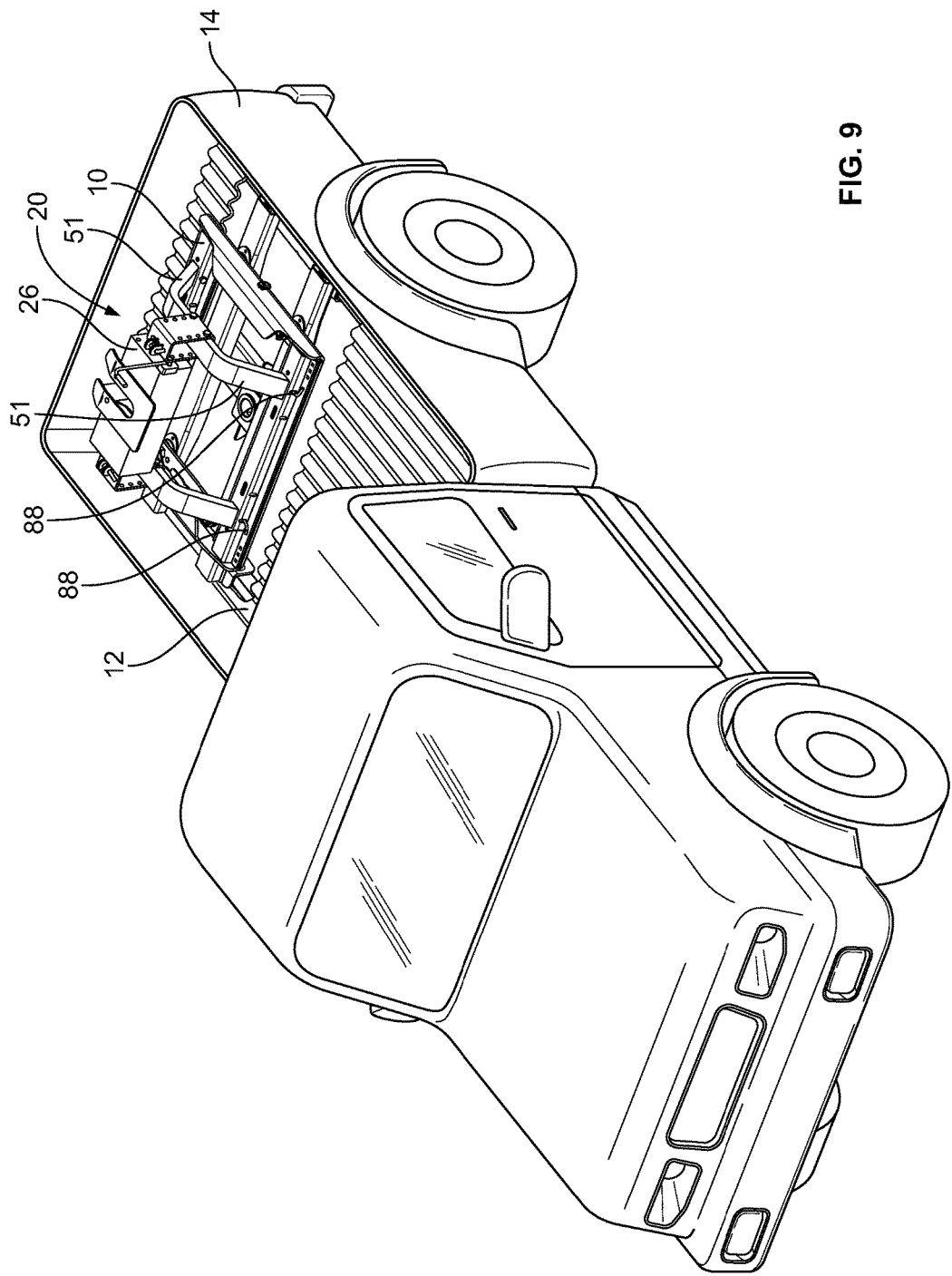
FIG. 9 is a perspective view of a towing vehicle having an under bed hitch mounting system attached to a frame below a load bed of the vehicle with an adapter attached to the under bed hitch mounting system and a fifth wheel hitch attached to the adapter.

In other embodiments, the adapter 210 may include at least one transverse member 230; as shown in FIG. 7 the adapter 210 may include a pair of transverse members 230. The transverse members 230 may include bottom portions 235 and top portions 236. The top portions 235 may generally cover at least a portion of the bottom portion 236 and in some embodiments may generally the entire bottom portions 236. This may create generally C-shaped transverse members 230.

The mounting member 230 may include access points 239. In some embodiments, the access points 239 may be generally formed by the formation of the top portion 236 and bottom portion 235. By way of a non-limiting example, the top portion 236 may be formed with a generally circular access point 239 as shown, but may be of any appropriate shape and size. Further, the access points 239 may be formed in any appropriate manner. The access points 239 may permit an operator to generally access the apertures 238 on the mounting member 230. This access may assist in installing the adapter 210 to the under bed hitch mounting system 20 and the appropriate vehicle.

The mounting members 230 may further include a handle 237. In some embodiments, each of the mounting members 230 may include the handle 237, which may be positioned on the top portion 236 of the mounting member 230 in any appropriate manner, such as by way of a non-limiting example, by fastening, welding, or integrally forming such together. In other embodiments, only one of the mounting members 230 may include the handle 237. The handle 237 may be used to help carry and position the adapter 210. The handle 237 may make the adapter 210 easier to carry and may make positioning the adapter 210 in the appropriate position generally easier. It should be understood, however, that the handle 237 may not be included in any of the mounting members 230.

The adapter 210 may include at least rail 240 that may be coupled to the transverse members 230 in any appropriate manner. In some embodiments, the adapter 210 may include a pair of rails 240; each such pair of rails 240 may be attached to the transverse members 230. The rails 230 may have a generally rectangular cross-section and that may include first ends 242 and second ends 244. In these embodiments, the rails 230 may be a generally tubular member as shown in FIG. 7. The first and second ends 242, 244 may generally attach to the transverse member 230 such that the transverse member 230 may generally fit between the first and second ends 242, 244 of the rails 230. The rails 240 and transverse members 230 may be attached together in any appropriate manner, including, without limitation by welding, using fasteners, adhesives, integrally forming, or the like.

The rails 240 of the adapter 210 may further include at least one accessory securing member 245. In some embodiments, each rail 240 may include four such accessory securing members 245. In these embodiments, each end 242, 244 of each rail 240 may include a pair of accessory securing members 245. This may allow additional accessories to be capable of being attached to the adapter 210, including, without limitation additional varieties of fifth wheel hitches may be capable of being attached to the adapter 210. The accessory securing member 245 may include at least one slot 246 and at least one aperture 248; the apertures 248 may extend entirely through the rails 240. In these embodiments, the rails 240 may include any appropriate number of accessory securing members 245. By way of a non-limiting example, the rails 240 may include any appropriate number of slots 246 and apertures 248. The apertures 248 may be positioned on the rails 240 such that they may generally correspond to the position of slots 246; and the number of apertures 248 may generally match the number of slots 246 on each rail 240.

The accessory securing members 245 may be positioned on the rails 240 such that the appropriate accessory may be selectively secured thereto. In some embodiments, the accessory securing members 245 may be positioned on the rails 240 such that the legs 51 of the fifth wheel hitch 26 may be attachable thereto. By way of a non-limiting example, the slots 246 may be sized and positioned along the rails 240 such that the leg 51 of the fifth wheel hitch 26 may be insertable therein. The number and position of the slots 246 may generally correspond to the location and position of the legs of a variety of fifth wheel hitches. It should be understood, however, that although slots 246 and corresponding apertures 248 are shown as the accessory securing member 245, the present teachings are not limited to such. The accessory securing members 245 may include any mechanism that may attach a fifth wheel hitch or other accessory to the adapter 210. The adapter 210 may otherwise generally operate as the adapter 10 described above.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

I claim:

1. A combination of an adapter and an under bed hitch mounting system comprising:
   an under bed rail engageable with a vehicle below a load bed of the vehicle;
   a receiving member positioned in the under bed rail;
   a mounting member configured to be positioned on the load bed of the vehicle;
   a locking member selectively positioned on the mounting member, wherein the locking member selectively engages the receiving member operatively securing the mounting member to the under bed rail;
   at least one rail attached to the mounting member; and
   at least two pairs of accessory securing members positioned in the at least one rail, the accessory securing members allowing a plurality of different configured fifth wheel hitch legs to be selectively secured with two of the at least two pairs of accessory securing members.

2. The adapter of claim 1, further comprising a plurality of apertures positioned in predetermined positions on the mounting member.

3. The adapter of claim 2, wherein the locking member is engageable with at least one of the plurality of apertures.

4. The adapter of claim 2, wherein the locking member includes at least one locking lug capable of entering into and seating in a cavity of the receiving member.

5. The adapter of claim 4 wherein, the locking member may be rotated approximately 90 degrees with respect to the receiving member to engage the locking lugs with the receiving member thereby securing the locking member in the receiving member.

6. The adapter of claim 5, wherein the locking member includes an accessory mounting shank capable of being inserted through at least one of the apertures in the mounting member.

7. The adapter of claim 6 further comprising a handle connected to the locking member, wherein the handle is selectively positionable so that the accessory mounting shank may extend through the mounting member and may be received in an aperture in the handle.

8. The adapter of claim 7 wherein the handle selectively positions the locking member to align the locking member with the receiving member.

9. The adapter of claim 1 further comprising at least one access point located on the mounting member, wherein the access point allows access to the locking member positioned on the mounting member.

\* \* \* \* \*